United States Patent
Brady et al.

(10) Patent No.: US 9,738,833 B2
(45) Date of Patent: Aug. 22, 2017

(54) PROCESS FOR CONVERSION OF BIOMASS IN MULTI-ZONE REACTOR

(71) Applicant: Inaeris Technologies, LLC, Pasadena, TX (US)

(72) Inventors: Michael Brady, Studio City, CA (US); Ronald Lee Cordle, League City, TX (US); Peter Loezos, Sugar Land, TX (US); Dennis Stamires, Dana Point, CA (US)

(73) Assignee: Inaeris Technologies, LLC, Pasadena, TX (US)

( * ) Notice: Subject to any disclaimer, the term of this patent is extended or adjusted under 35 U.S.C. 154(b) by 11 days.

(21) Appl. No.: 14/671,335

(22) Filed: Mar. 27, 2015

(65) Prior Publication Data

US 2015/0203763 A1  Jul. 23, 2015

Related U.S. Application Data

(62) Division of application No. 12/947,449, filed on Nov. 16, 2010, now Pat. No. 9,017,428.

(51) Int. Cl.
| | |
|---|---|
| *C10G 1/02* | (2006.01) |
| *B01J 8/24* | (2006.01) |
| *C10G 1/00* | (2006.01) |
| *B01J 23/90* | (2006.01) |
| *B01J 29/90* | (2006.01) |

(Continued)

(52) U.S. Cl.
CPC ............... *C10G 1/002* (2013.01); *B01J 8/24* (2013.01); *B01J 23/90* (2013.01); *B01J 29/90* (2013.01); *B01J 38/12* (2013.01); *C10B 49/22* (2013.01); *C10B 53/02* (2013.01); *C10B 57/18* (2013.01); *C10G 1/02* (2013.01); *B01J 2208/00769* (2013.01); *C10G 2300/1011* (2013.01); *C10G 2300/1014* (2013.01); *C10G 2300/4081* (2013.01); *C10G 2300/4093* (2013.01); *Y02E 50/14* (2013.01); *Y02P 20/133* (2015.11); *Y02P 20/145* (2015.11); *Y02P 30/20* (2015.11); *Y02T 50/678* (2013.01)

(58) Field of Classification Search
USPC .................................. 422/140; 585/240, 242
See application file for complete search history.

(56) References Cited

U.S. PATENT DOCUMENTS

| | | |
|---|---|---|
| 4,511,434 A | 4/1985 | Vasalos |
| 2004/0069682 A1 | 4/2004 | Freel |

(Continued)

FOREIGN PATENT DOCUMENTS

| | | |
|---|---|---|
| CN | 101318622 A | 12/2008 |
| CN | 101654395 A | 2/2010 |

(Continued)

*Primary Examiner* — Prem C Singh
*Assistant Examiner* — Chantel Graham
(74) *Attorney, Agent, or Firm* — John Wilson Jones; Jones Delflache LLP

(57) ABSTRACT

A two-stage reactor is disclosed for the conversion of solid particulate biomass material. The reactor is designed to maximize conversion of the solid biomass material, while limiting excess cracking of primary reaction products. The two-stage reactor comprises a first stage rector, in which solid biomass material is thermally pyrolyzed to primary reaction products. The primary reaction products are catalytically converted in a second stage reactor.

26 Claims, 1 Drawing Sheet

(51) Int. Cl.
*B01J 38/12* (2006.01)
*C10B 49/22* (2006.01)
*C10B 53/02* (2006.01)
*C10B 57/18* (2006.01)

(56) References Cited

U.S. PATENT DOCUMENTS

| | | |
|---|---|---|
| 2006/0185245 A1 | 8/2006 | Serio et al. |
| 2009/0227823 A1 | 9/2009 | Huber et al. |
| 2010/0228062 A1 | 9/2010 | Babicki et al. |
| 2012/0193581 A1* | 8/2012 | Goetsch .................. C01B 3/50 |
| | | 252/373 |

FOREIGN PATENT DOCUMENTS

| | | |
|---|---|---|
| CN | 101691495 B | 7/2012 |
| WO | WO2010039264 A | 4/2010 |

* cited by examiner

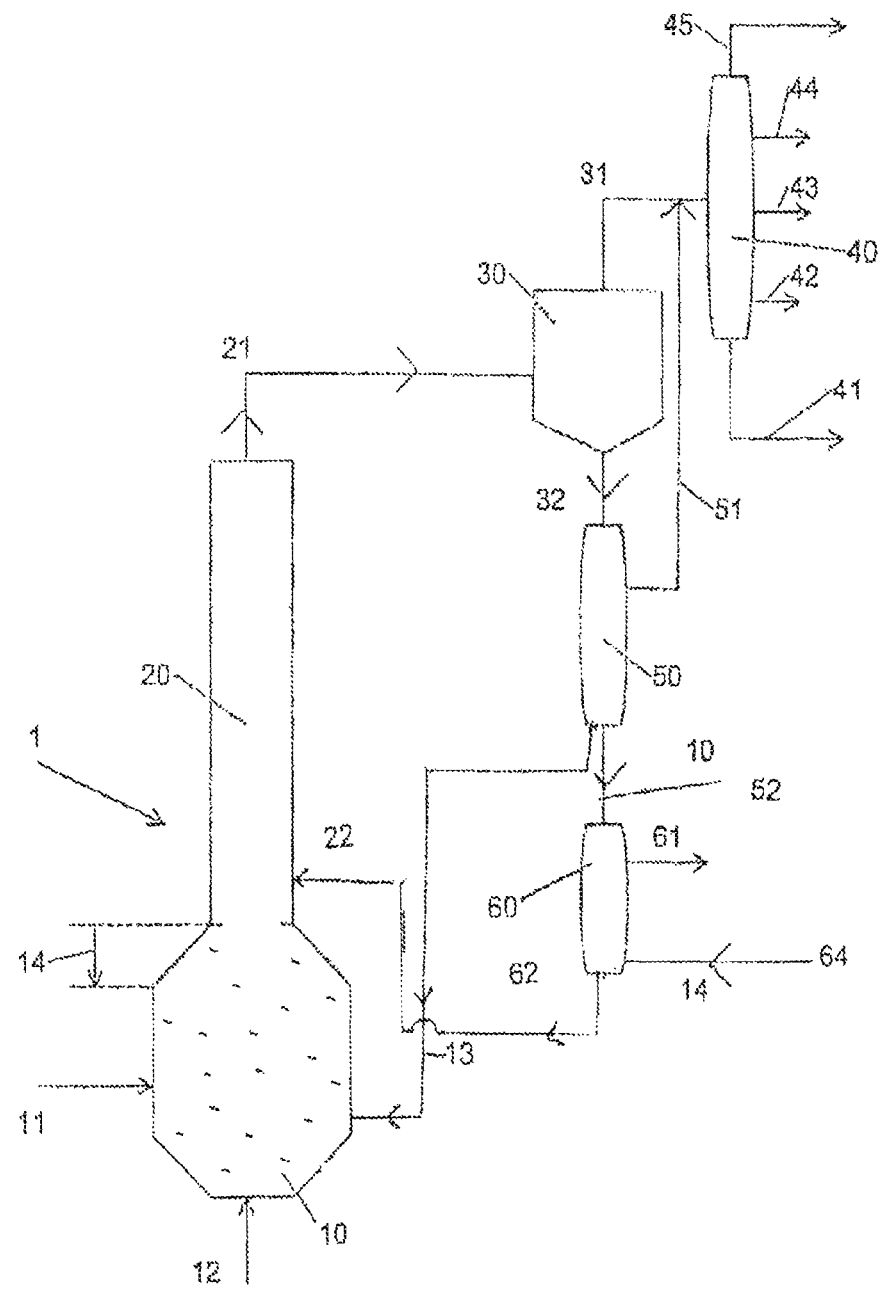

PROCESS FOR CONVERSION OF BIOMASS IN MULTI-ZONE REACTOR

This application is a divisional application of U.S. patent application Ser. No. 12/947,449, filed on Nov. 16, 2010, herein incorporated by reference.

FIELD OF THE INVENTION

The invention relates generally to an improved process and apparatus for converting solid particular biomass material to gaseous and liquid product. More particularly aspects of the invention relate to a two-stage process.

BACKGROUND OF THE INVENTION

Biomass, in particular biomass of plant origin, is recognized as an abundant potential source of fuels and specialty chemicals. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemicellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gasses such as hydrogen, which increases capital and operating costs), require expensive catalysts, suffer low conversion efficiency (e.g., incomplete conversion or inability to convert lingo-cellulosic and hemi-cellulosic material), and/or suffer poor product selectivity.

Therefore, a need remains for novel and improved processes for the conversion of solid biomass materials to produce fuels and specialty chemicals.

BRIEF SUMMARY OF THE INVENTION

Aspects of the invention generally relate to process and apparatus for converting solid particulate biomass.

One aspect of the invention relates to a two-stage reactor for the conversion of a solid particulate biomass material, comprising (i) a first stage reactor in which at least part of particulate solid biomass material is thermally pyrolyzed to form primary reaction products; and (ii) a second stage reactor in which at least part of the primary reaction products are catalytically converted to secondary reaction products. The first stage and second stage reactors are in fluid communication. Preferably, the second stage reactor has an internal diameter which is substantially less than an internal diameter of the first stage reactor. In some embodiments, the first stage reactor has an internal diameter $d_1$ the second stage reactor has an internal diameter $d_2$, wherein the ratio $d_1:d_2$ is in the range of from 1.3:1 to 15:1, in the range of from 2:1 to 10:1 or in the range of 3.5:1 to 7:1.

In some embodiments, the two-stage reactor comprises a means for injecting a lift gas into the first stage reactor, wherein the lift gas transports primary reaction products from the first stage reactor to the second stage reactor. In some embodiments, the first reactor contains an inert particulate material. In some cases, the inert particulate material is a deactivated particulate catalyst material, an inert particulate solid heat carrier material or a mixture thereof. In some embodiments, the inert particulate material is sand.

In some embodiments, the reactor is a circulating fluidized bed reactor, an ebullated bed reactor or an entrained fluid bed reactor. In some embodiments, the deactivated particulate catalyst material is entrained from the first stage reactor into the second stage reactor.

In some embodiments, the second stage reactor is provided with a means for injecting a particulate solid catalyst.

In some embodiments, the two-stage reactor further comprises a means for removing solid particles, such as deactivated catalyst particles, from the secondary reaction products.

In some embodiments, the two-stage reactor further comprises a stripper for stripping volatile materials from the deactivated catalyst particles.

In some embodiments, the two-stage reactor further comprises a means for injecting at least part of the deactivated catalyst particles from the stripper into the first stage reactor.

In some embodiments, the two-stage reactor further comprises a heat exchanger for heating or cooling the deactivated catalyst particles from the stripper before injection into the first stage reactor.

In some embodiments, the two-stage reactor further comprises a regenerator for regenerating at least part of the deactivated catalyst particles from the stripper.

In some embodiments, the two-stage reactor further comprises means for injecting regenerated catalyst particles from the regenerator into the second stage reactor.

In some embodiments, the two-stage reactor further comprises a heat exchanger for heating or cooling regenerated catalyst particles from the regenerator before injection into the second stage reactor.

In some embodiments, the two-stage reactor further comprises a feeder system for feeding solid particulate biomass material into the first stage reactor. Preferably, the feeder system comprises a heat exchanger for heating or cooling the solid particulate biomass material prior to feeding into the first stage reactor.

In another aspect, the invention relates to a two-stage process for the conversion of solid particulate biomass material, comprising (i) a first stage in which at least part of the solid particulate biomass material is subjected to thermal pyrolysis in a first zone of a reactor to produce primary reaction products; and (ii) a second stage in which at least part of the primary reaction products is catalytically converted to secondary reaction products in a second zone of the reactor, wherein the first and second zones of said reactor are in fluid communication and wherein the internal diameter of the first zone is greater than the internal diameter of the second zone. The primary reaction products are entrained from the first zone of the reactor to the second zone of the reactor by a lift gas.

In some embodiments, the first stage is carried out in a fluidized bed reactor wherein the fluidized bed reactor is circulating fluidized bed reactor, an ebullated bed reactor or an entrained fluid bed reactor. In some embodiments, the fluidized bed comprises an inert particulate heat carrier material, a deactivated particulate catalyst or a mixture thereof.

In some embodiments, the entrained bed comprises a deactivated particulate catalyst.

In some embodiments, the second stage of the process comprises contacting the primary reaction products with a catalyst. The catalyst comprises can be a solid acid or a super acid. In some embodiments, the catalyst comprises zeolite, ZSM-5, zeolite-Y, or modified forms of ZSM-5 and zeolite-Y; dealuminated zeolites, ultrastable zeolites, mordenites, mesoporous materials, or a combination thereof. In some embodiments, the catalyst comprises sulfonated, phosphated, or fluorinated forms of zirconia, titania, alumina, silica-alumina, clays, or a combination thereof. In some embodiments, the catalyst comprises a solid base. The catalyst can be an oxide, hydroxide or carbonate of a metal, a layered double hydroxide, a mixed metal oxide, a hydrotalcite, a hydrotalcite-like material, a clay, a clay comprising alkaline earth or transition or rare earth metal oxides, hydroxides, carbonates, hydroxy carbonates, or a combination thereof. In some embodiments, the catalyst comprises an alumina, titania, or zirconia. In some embodiments, the catalyst comprises a calcined clay, for example kaolin. In preferred embodiments, the catalyst has a specific surface area in the range of from 1 to 400 $m^2/g$.

In some embodiments, the process further comprises the step (iii) of separating deactivated catalyst particles from the secondary reaction products.

In some embodiments, the process further comprises the step (iv) of removing volatile materials from the deactivated catalyst particles in a stripper.

In some embodiments, the process further comprises the step (v) of injecting at least part of the deactivated catalyst particles from the stripper into the first stage reactor. The deactivated particles can be heated or cooled prior to injection into the first stage reactor.

In some embodiments, the process further comprises the step (vi) of regenerating at least part of the deactivated catalyst particles in a regenerator.

In some embodiments, the process further comprises the step of (vii) injecting regenerated catalyst particles from the regenerator into the second stage reactor. The regenerated catalyst particles can be heated or cooled prior to injection into the second stage reactor.

In some embodiments, the process further comprises the step of feeding solid particulate biomass material into the first stage. The solid particulate biomass material can be heated or cooled prior to feeding into the first stage.

In some aspects of the invention, the process for converting solid particulate biomass comprises the steps of (i) providing the solid particulate biomass in a circulating fluidized reactor; (ii) thermally pyrolyzing at least a portion of the solid particulate biomass in the absence of a catalyst to form primary reaction products within a lower zone of the reactor; and catalytically converting at least a portion of the primary reaction products into secondary product in presence of a catalyst within an upper zone of the reactor.

BRIEF DESCRIPTION OF THE DRAWINGS

The features and advantages of the invention will be illustrated in reference to the following drawing. The drawing is not to scale and certain features are shown exaggerated in scale or in schematic form in the interest of clarity and conciseness.

FIG. 1 is a schematic view of a two-stage reactor, for carrying out a specific embodiment of the process of the invention.

DETAILED DESCRIPTION OF THE INVENTION

There is an urgent need to find processes for converting solid biomass materials to liquid fuels as a way to reduce mankind's dependence on fossil fuel, to increase the use of renewable energy sources, and to reduce the build-up of carbon dioxide in the earth's atmosphere.

Pyrolysis processes, in particular flash pyrolysis processes, are generally recognized as offering the most promising routes to the conversion of solid biomass materials to liquid products, generally referred to as bio-oil or bio-crude. In addition to liquid reaction products, these processes produce gaseous reaction products and solid reaction products. Gaseous reaction products comprise carbon dioxide, carbon monoxide, and relatively minor amounts of hydrogen, methane, and ethylene. The solid reaction products comprise coke and char.

In order to maximize the liquid yield, while minimizing the solid and gaseous reaction products, the pyrolysis process should provide a fast heating rate of the biomass feedstock, a short residence time in the reactor, and rapid cooling of the reaction products, and disengagement from the reaction zone. Lately, the focus has been on ablative reactors, cyclone reactors, and fluidized reactors to provide the fast heating rates. Fluidized reactors include both fluidized stationary bed reactors and transport reactors.

Transport reactors provide heat to the reactor feed by injecting hot particulate heat carrier material into the reaction zone. This technique provides rapid heating of the feedstock. The fluidization of the feedstock ensures an even heat distribution within the mixing zone of the reactor.

The biomass to be pyrolyzed is generally ground top a small particle size in order to optimize pyrolysis. The biomass may be ground in a grinder or a mill until the desired particle size is achieved. Particle size reduction of solid biomass requires input of large amount of energy, and consequently is a costly process. Therefore, there is particular need for apparatus and processes for converting solid biomass into gaseous and liquid products that do not require extensive particle size reduction of the solid biomass material feed and do not require extensive upgrading of the reaction products.

Accordingly, aspects of the invention relate to a process for converting solid particulate biomass material to gaseous and liquid fuels that does not require extensive particle size reduction of the solid biomass material feed. Moreover, aspects of the invention relate to an apparatus or processes providing substantially complete conversion of the solid particulate biomass material, while avoiding excessive cracking of the primary reaction products.

Historically, entrained bed reactors or fluidized bed reactors have been used for the conversion of liquid products, using a conversion temperature exceeding the boiling point of the liquid feedstock. An example is the ubiquitous fluid catalytic cracking ("FCC") process, used in crude oil refineries for converting heave crude oil fractions, such as vacuum gas oil (VGO) to lighter products, such as gasoline and diesel blending stocks. At the bottom of an FCC second stage reactor, liquid feedstock is sprayed into a flow of a lift gas in which is entrained a hot, particulate catalyst. The heat carried by the particulate catalyst causes fast evaporation of the feedstock droplets. Due to this fast evaporation, the feedstock components become quickly and evenly heated. In addition, the feedstock vapors expand the volume of gases in the second stage reactor, causing acceleration of both the catalyst particles and the feedstock components, ensuring vigorous mixing of the feedstock and the catalyst particles, and the virtual absence of back-mixing.

Entrained bed reactors operated with a solid particulate feedstock exhibit a mixing behavior that is distinctly different from liquid feedstock systems, such as the FCC reactor. Different from liquid feedstocks, solid biomass particles do not rapidly evaporate upon mixing with hot heat carrier particles. Instead, the solid particles become smaller in a process that can be described as reactive ablation. Initially, only the outer surface of the solid particle becomes hot enough for pyrolytic conversion of the solid biomass material to take place. The pyrolysis products evaporate from the outer shell of the solid particle, exposing an underlying layer of solid biomass material to the reactor temperature. Once hot enough for pyrolysis to take place, this outer layer also evaporates, etc. As a result, the biomass particle becomes gradually smaller as the pyrolysis reaction progresses. It will be appreciated, however, that this process is slow as compared to the evaporation of a VGO droplet in an FCC riser. The process is slowed down further by the virtually inevitable presence of moisture in the biomass feedstock, which needs to be evaporated before the temperature of the biomass material can be raised significantly above the boiling point of water.

Since the goal generally is to ensure complete conversion of the biomass material, the operator of the entrained bed reactor needs to select reactor conditions that provide a fast enough heat transfer to the solid biomass particles. This can be accomplished by selecting a high enough temperature of the particulate heat transfer material, and a high enough heat transfer medium/feedstock ratio.

Measures necessary to increase the heat transfer to the solid biomass material contribute to the cracking of primary pyrolysis products. Although some cracking of primary pyrolysis products is desirable, excessive cracking increases the coke and gas yields, at the expense of the liquid yield. In some instance, the resulting liquid product has properties that are described as desirable for "liquid smoke" food flavoring products (low pH, high oxygen content, browning propensity), but that are undesirable for liquid fuels.

Due to these conflicting requirements, it has proven difficult to develop satisfactory processes for converting solid biomass material in an entrained bed reactor. Aspects of the invention allows for the separation of the pyrolysis step and the catalytic conversion step for optimization of biomass conversion. By separating the pyrolysis and the catalytic conversion processes, independent control of the reaction conditions of each process is possible, allowing the optimization of each process. For example, reaction conditions such as temperature of the reactor, catalyst to reaction product material mass ratio, residence time of the reaction products, weight hourly space velocity (WHSV), as described below, can be independently controlled. Accordingly, each process is optimized resulting in an overall increase of the performance such as higher yield of bio-oil of bio-fuel product, lower yields of coke formation and overall higher quality of the final conversion product.

In some aspects of the invention, these problems are addressed by providing a two-stage process for the conversion of solid particulate biomass material, comprising (i) a first stage in which at least part of the solid particulate biomass material is subjected to thermal pyrolysis to produce primary reaction products; and (ii) a second stage in which at least part of the primary reaction products are catalytically converted to secondary reaction products.

In some embodiments, the two stage process comprises (i) pyrolyzing within a first stage zone of a reactor at least a portion of the solid particulate biomass under appropriate reaction conditions to produce one or more primary reaction products: and (ii) catalytically converting within a second stage zone of a reactor at least a portion of the primary reaction products using a catalyst under appropriate reaction conditions to produce one or more secondary reaction products. In preferred embodiments, the two stage process occurs in a single reactor. In preferred embodiment, the reactor is a two-stage reactor.

Some aspects of the invention relate to a two-stage reactor comprising a first stage reactor and a second stage reactor. The second stage reactor is positioned above the first stage reactor. As used herein, the first stage and the second stage correspond to the lower and the upper zone or section of a single reactor. Preferably, the two zones of the reactor have different geometries. For example, the lower zone of the reactor has a frustrum geometry and the second zone is cylindrical. In some embodiments and as discussed below, the two stages or zones of the reactor can have different diameters. In the first stage reactor, the particulate solid biomass material is thermally pyrolyzed, to form primary reaction products. The primary reaction products are conveyed from the first stage reactor to the second stage reactor. For this purpose, the second stage reactor is in fluid communication with the first stage reactor. In the second stage reactor the primary reaction products are catalytically converted to secondary reaction products.

The term "thermal pyrolysis" as used herein refers to a chemical conversion of a feedstock, such as a solid particulate biomass material, effected by heating the feedstock in the substantial absence of a catalyst, in an atmosphere that is substantially free of oxygen. The atmosphere may be an inert gas, such as nitrogen. Alternatively, the atmosphere can comprise a reducing gas, such as hydrogen, carbon monoxide, steam, or a combination thereof.

Thermal pyrolysis is carried out in the substantial absence of a catalyst. For the purpose of the present invention, a catalyst is any solid particulate inorganic material either (i) having a specific surface area (as measured by nitrogen adsorption using the Brunauer Emmett Teller (BET) method of less than 1 $m^2/g$; or (ii) having a specific surface area of more than 1 $m^2/g$, but is not catalytically active due to inactivation.

The process and the reactors of the invention can be used for converting any type of solid biomass material. Preferred are biomass materials comprising cellulose, in particular lignocellulose. Such materials are abundantly available, at low cost. Examples of cellulose-containing materials include algae, paper waste, and cotton linters. Examples of lignocellulosic materials include forestry waste, such as wood chips, saw dust, pulping waste, and tree branches;

agricultural waste such as corn stover, wheat straw, bagasse, and energy crops such as eucalyptus, switch grass, and coppice.

Solid biomass materials generally contain minerals. It is recognized that some of these minerals, such as potassium carbonate, can have catalytic activity in the pyrolysis of the biomass material. Even though these minerals are typically present during the chemical conversion taking place in the first stage reactor, this conversion is considered a thermal pyrolysis, because no catalyst as defined herein is added to the process at this stage. Even if minerals are allowed to accumulate in the first stage reactor, for example due to recycling of certain streams, the reaction in the first stage is still considered a thermal pyrolysis.

Particulate solid biomass material is introduced into the first stage reactor. Any suitable means for conveying a solid particulate material may be used for this purpose. Examples include gravity feed from a hopper or other container, a screw conveyer, a positive displacement pump a pneumatic feeding system and the like. In a particularly preferred embodiment, the solid particulate biomass material is fluidized in a portion of the lift gas, and entrained into the first stage reactor by the lift gas.

In a preferred embodiment, a heat exchanger is part of the feed system, so that the solid particulate biomass material can be heated or cooled prior to introduction into the first stage reactor.

In some embodiments, the first stage is carried out in an ebullated bed. In preferred embodiments, the first stage is carried out in circulating fluidized bed. The bed can be ebullated or fluidized by means of a lift gas. In some embodiments, a lift gas is injected into the first stage reactor. The lift gas can also be used for conveying primary reaction products from the first stage to the second stage.

The lift gas is preferably introduced into the first stage reactor located at the bottom of the first stage reactor. It will be understood that a portion of the gas may be used to pre-fluidize the solid particulate biomass material, in which case this portion of the lift gas is introduced into the first stage reactor via the inlet for the particulate solid biomass material.

The lift gas preferably is essentially oxygen-free, so as to provide an oxygen-free atmosphere for the biomass conversion reaction. The lift gas may be an inert gas, for example nitrogen. Alternatively, the lift gas may comprise a reducing gas, such as hydrogen and/or carbon monoxide. The lift gas can comprise one or more hydrogen-donor compounds, such as steam, lower alkane (methane, ethane, and the like), or other hydrocarbons.

In another embodiment, the lift gas can comprise a hydrogen donor compound, for example tires, plastic waste, and the like.

In some embodiments, a second particulate material, other than the particulate solid biomass material is present in the first stage. This material can be an inert particulate material, or a deactivated particulate catalyst material, or a mixture of an inert particulate material and a deactivated particulate catalyst material.

In one embodiment, the first stage reactor is operated such that the second particulate material remains in the first stage reactor. Specifically, the first stage reactor of this embodiment can be operated as an ebullated bed reactor. In this embodiment the second particulate material can be an inert material, such as sand.

In some embodiments, the first stage process is carried out in a first stage reactor. In some embodiments, the first stage reactor is an entrained fluid bed reactor. In this embodiment, the second particulate material does not remain in the first stage reactor, but is conveyed, for example by the lift gas, to the second stage reactor. In some embodiments, a stream of the second particulate material is injected into the first stage reactor, to compensate for the material being conveyed to the second stage reactor.

In some embodiments, it is advantageous to use the second particulate material as a particulate solid heat carrier material. In a preferred embodiment, the particulate solid heat carrier material is a deactivated particulate catalyst.

The particulate solid heat carrier material must be readily fluidizable. The material generally has a mean particle diameter in the range of from about 10 μm to 600 μm, preferably in the range of from about 50 μm to 200 μm. The particles preferably have a shape index in the range of 1 to 2. Most preferred are microspheres, having a shape index of about 1.

In a specific embodiment, the second stage is carried out in a second stage reactor. In some embodiments, the second stage reactor is an entrained fluid bed reactor. The second stage reactor can be provided with a means for injecting a particulate solid catalyst. Preferably, in the second stage reactor, the primary reaction products are contacted with a catalyst.

In some embodiments, independent control of the first stage and the second stage reactors' reaction conditions, such as temperature and WHSV, is achieved by determining the first and second reactors geometries. For example, the ability to control WHSV is important to the extent that too Iowa WHSV can result in a low conversion of feed to product and too high a WHSV can result in undesirable product reactions. In preferred embodiments, the internal diameter of the first stage reactor is $d_1$ the internal diameter of the second stage reactor is $d_2$; wherein $d_1 > d_2$. The ratio of the diameters of the first stage reactor and of the second stage reactor generally is in the range of from 1.3:1 to 15:1; preferably in the range of from 2:1 to 10:1; more preferably in the range of from 3.5:1 to 7:1.

The velocity of the lift gas in the first stage reactor must be sufficient to entrain the heat carrier particles. The velocity of the lift gas is relatively slow in the first stage reactor, and becomes accelerated upon entering the second stage reactor, as the second stage reactor has a diameter which is significantly smaller than the diameter of the first stage reactor. The acceleration is inversely proportional to the square of the diameter ratio. Thus, if the diameter of the second stage reactor is one half of the diameter of the first stage reactor, the linear velocity of the lift gas in the second stage reactor is four times its linear velocity in the first stage reactor.

The mean particle diameter of the solid biomass material must be small enough for the biomass material to become ebullated or fluidized in the first stage reactor. The particle diameter does not need to be so small that the biomass material becomes entrained in the lift gas. In general, the biomass material particles remain in the first stage reactor until the reactive ablation process has reduced the particle size sufficiently for the particles to become entrained in the lift gas.

In some aspects, the processes and reactors of the invention avoid the need for milling or grinding the particles of biomass material to a very small size. Due to the low density of biomass material, particles up to about 20 mm in size can be fluidized in the first stage reactor. Preferred are particles having a diameter in the range of from 2 mm to 15 mm, more preferably from 5 mm to 12 mm.

In some embodiments, the biomass particles may be so small as to become entrained by the lift gas in the first stage reactor. Thus, the reactor can be operated with biomass particles as small as 200 μm or less, which is an advantage when recycling biomass fines. Particularly desirable is a particulate biomass material feedstock having a mean particle diameter in the range of from 2 mm to 500 μm, more preferably from 1 mm to 700 μm.

In its steady state of operation, the first stage reactor contains an entrained bed of heat transfer particles, and an ebullated bed of solid particulate biomass material. The latter bed is semi-stationary, as distinguished from stationary, in that it continuously loses ablated particles that become entrained, which are replenished with new feed particles of biomass material.

The two beds are thoroughly mixed, whereby heat is transferred from the heat carrier material to the biomass material. In some embodiments, the temperature of the heat carrier material, and the weight ratio heat carrier material/biomass material, are adjusted so as to maintain a desired temperature in the first stage reactor. The temperature in the first stage reactor is generally maintained at a desired point in the range of from about 350° C. to about 600° C. In many cases, the temperature in the first stage reactor is in the range of from 400° C. to 550° C. is preferred.

In an exemplary embodiment, the second reactor is operated at a riser outlet temperature of 565° C. where catalysis reactions take place. Associated with the second reactor, the first reactor is operated at a lower temperature, ranging from 450° C. to 500° C. In some embodiments, the residence time and reactor length necessary for full biomass conversion into primary pyrolysis products can be calculated if the average velocity is known. For example, assuming an average superficial velocity of 15 ft/sec in the first stage and complete pyrolysis of the biomass, the residence time and reactor length necessary for full biomass conversion into primary pyrolysis products reported in the table below.

| First Stage | | | |
|---|---|---|---|
| Reactor Temperature (DC) | 450 | 475 | 500 |
| Catalystlbiomass | 27 | 20 | 15 |
| Velocity (ft/sec) | 15 | 15 | 15 |
| Residence time (sec) | 3 | 2 | 1 |
| Reactor length (ft) | 45 | 30 | 15 |
| Second Stage | | | |
| Reactor Temperature (DC) | 565 | | |
| Catalysi/biomass* | 13 | | |
| Velocity (ft/sec) | 50 | | |

*Not including catalyst from the First Stage

In some embodiments, the first reactor geometry can be determined using typical pyrolysis kinetics. See for example, C. Di Blasi et al (Ind. Eng. Chem. Res., Vol. 40 (2001) pg. 5547-5556) which is incorporated herein in its entirety.

At the temperature of the first stage reactor, the solid biomass material pyrolyzes to gaseous and vaporized primary reaction products. Unlike the solid biomass material particles from which these reaction products emanate, the reaction products become immediately entrained. As a result, the contact time of the primary reaction products in the first stage reactor is very short. This feature of the inventive process ensures that cracking of reaction products can be kept to the desired level, and over-cracking can be minimized.

As desired, the second stage reactor can be operated at the same temperature as the first stage reactor, or at a lower temperature, or at a higher temperature. In some embodiments, the temperature of the second reactor is in the range from about 200° C. to about 500° C.

In some embodiments, the temperature of the second stage is higher than the temperature of the first stage reactor. The temperature in the second stage reactor is primarily determined by the temperature of the catalyst being injected, and the catalyst/feed ratio in the second stage reactor. Accordingly, the temperature of the second stage can be raised by injecting a stream of heat carrier particles into the second stage reactor. Alternatively, the temperature can be raised by injecting a hot gas or steam.

In an alternate embodiment, the temperature in the second stage reactor is quenched, for example by injecting a gas or a solid particulate material, or steam, having a lower temperature than that of the reaction products leaving the first stage reactor, to avoid excessive cracking.

The temperature in the first stage reactor can be maintained by injecting into the first stage reactor an appropriate amount of the particulate heat carrier material. The heat carrier material can be an inert material, such as sand. It is not uncommon for sand to be introduced as a contaminant of the biomass material feedstock. As heat carrier material is preferably circulated back into the reactor, there can be a build-up of sand in the heat carrier material composition over time. Generally the particulate heat carrier material has a mean particle diameter in the range of from about 50 μm to about 200 μm. The shape index is preferably below 2. Most preferred are microspheres having a shape index of about 1.

In some embodiments, a stream of solid biomass particles, a stream of hot solid particulate heat carrier material and a flow of lift gas is injected into the first stage reactor to cause the solid particulate biomass material and the solid heat carrier material to become fluidized by the lift gas.

Due to the relatively long contact time of the solid biomass material in the first stage reactor, the process can handle biomass feedstock materials having high moisture content, for example up to 40 wt %. Materials having low moisture content can be handled as well, down to 1 wt % moisture or lower. In general materials having moisture content in the range of from 5 wt % to 15 wt % provide ease of handling and are preferred for that reason.

In preferred embodiments, a catalyst is injected into the second stage reactor. This catalyst can comprise a solid acid, such as a zeolite. Examples of suitable zeolites include ZSM-5, zeolite-Y, and modified forms of ZSM-5 and zeolite-Y, dealuminated zeolites, ultrastable zeolites, mordenites, mesoporous materials, and combinations thereof. Additionally, the catalyst may comprise a super acid, for example sulfonated, phosphated, or fluorinated forms of zirconia, titania, alumina, silica-alumina, clays, and the like. In other embodiments, a super acid catalyst, such as sulfated zirconium super catalyst can be used.

The catalyst can comprise a solid base. Suitable examples include metal oxides, metal hydroxides, and metal carbonates, in particular the oxides, hydroxides and carbonates of alkali metals, alkaline earth metals, transition metals, and/or rare earth metals.

Particularly suitable solid bases are layered double hydroxides, mixed metal oxides, hydrotalcites, hydrotalcite-like materials, clays and combinations thereof. As used herein, the term "hydrotalcite-like materials" refers to materials having the structure of hydrotalcite, but wherein the divalent metal is not Mg and/or the trivalent metal is not Al.

The catalyst can comprise an alumina; preferred are aluminas having a relatively low specific surface area, such as alpha-alumina. Other examples include zirconia, titania, and clays, in particular calcined clays.

It has been found that catalysts for use in the process of the invention preferably have a low to moderate catalytic activity, as too high a catalytic activity easily leads to over-cracking of the pyrolysis products. Accordingly, preferred are catalysts comprising calcined materials, in particular materials that have been calcined at temperatures above 500° C., or even above 1000° C. or 1100° C.

Suitable examples of calcined materials include clay materials that have been calcined, preferably through the isotherm. Kaolin is an example of suitable clay. The clay material may comprise alkaline earth or transition metal or rare earth oxides, hydroxides, carbonates, hydroxy carbonates.

Catalyst materials having the desired moderate catalytic activity generally have a specific surface area, as measured by nitrogen adsorption using the Brunauer-Emmett-Teller ("BET") method in the range of from 1 to 400 $m^2/g$.

In some aspects of the invention, the residence time of the reaction products in the first and second stage reactors are independently controlled and optimized. The residence time of the particulate biomass material in the first stage reactor portion of the reactor generally ranges from 0.1 second to 30 seconds, the lower limit corresponding to the operation with biomass fines, which become immediately entrained. The solid heat carrier material has a residence time in the second stage reactor in the range of from 0.1 second to 5 seconds.

Secondary reaction products, lift gas and solid heat carrier material are collected at the top of the second stage reactor. The solid material is separated from gases and vapors using anyone of the known techniques in the art, or a combination of such techniques, such as one or more cyclones, optionally in combination with a hot gas filter. Vapors can be condensed in a condenser or a fractionator. Specifically, the process can comprise a further step (iii) of separating deactivated catalyst particles from the secondary reaction products.

The solid material generally comprises deactivated catalyst particles, inorganic components from the biomass material, inorganic contaminants, and solid reaction products such as coke and char. Char particles can be readily separated, using well known oil refinery techniques.

In a preferred aspect of the invention, the regenerated catalyst and/or the deactivated catalyst are recycled back to the two-stage reactor. In some aspects of the invention, the deactivated catalyst is recycled back to the first stage reactor and/or the regenerated catalyst is recycled back to the second stage reactor.

In some embodiments, the process comprises the further step (iv) of removing volatile materials from the deactivated catalyst particles in a stripper. In a preferred embodiment, the process comprises a further step (v) in which deactivated catalyst particles from the stripper are recycled, at least in part, to the first stage reactor. In some embodiments, a heat exchanger is provided between the stripper and the first stage reactor, so that the deactivated catalyst particles can be cooled or heated prior to being injected into the first stage reactor.

The deactivated catalyst particles that are not recycled to the first stage reactor can be regenerated in a regenerator. In the regenerator, coke deposits are burned off in a stream of oxygen containing gas. Regenerated catalyst particles can be recycled to the second stage reactor, in a further process step (vi). In some embodiments, a heat exchanger is provided between the regenerator and the second stage reactor, so that the regenerated catalyst particles can be cooled or heated prior to being injected into the second stage reactor. Coke and char deposited on the heat carrier particles can be burned off in a regenerator. The heat generated in the regenerator can be used to re-heat the heat carrier particles. The hot heat carrier particles can be recycled to the first stage reactor.

Examples

The following is a description of an embodiment of the invention, given by way of example only and with reference to the drawing. In the illustrated embodiment, the process is carried out in a two-stage reactor, in which the first stage reactor is operated as an entrained fluid bed reactor.

Referring to FIG. 1, a two-stage reactor 1 is shown, comprising a first stage reactor 10 and a second stage reactor 20. Entering first stage reactor 10 are biomass material 11, lift gas 12, and deactivated catalyst particles 13. In first stage reactor 10, lift gas 12 forms an expanded bed of deactivated catalyst particles 13, well mixed with biomass material 11. In area 14 of first stage reactor 10, lift gas 12 undergoes an acceleration due to the tapering shape of the first stage reactor in this area.

At injection point 22, regenerated catalyst particles 62 are injected into second stage reactor 20.

Second stage reactor 20 contains vaporized and gaseous primary reaction products of the biomass conversion, secondary reaction products, lift gas, entrained deactivated catalyst particles, injected regenerated catalyst particles and, entrained biomass particles. The biomass particles preferably are reacted to full conversion in first stage reactor 10.

The gas/vapor/solids mixture 21 leaving second stage reactor 20 at the top is conveyed to cyclone 30, where it is split into a gas/vapor stream 31, and a solids stream 32. The vapor portion of gas/vapor stream 31 is condensed in fractionator 40. The liquid is split into fractions 41, 42, 43, and 44. Gas stream 45 can be recycled to first stage reactor 10 as lift gas 12, optionally after removal of gaseous reaction products.

Solids stream 32 from cyclone 30 is sent to stripper 50, where liquid reaction products are stripped off as stream 51, which can be combined with stream 31.

Deactivated catalyst particles 13 from stripper 50 are injected into first stage reactor 10. Solids stream 52 of deactivated catalyst particles from stripper 50 is sent to regenerator 60, where the catalyst particles are heated in a stream 64 of an oxygen-containing gas, such as air. Coke and char are burned off the heat carrier particles in regenerator 60. Flue gas 61, comprising CO and $CO_2$, can be combined with lift gas 12. Hot catalyst particles 62 are recycled to second stage reactor 20. Fresh catalyst carrier material 14 may be added to replenish heat carrier material lost in the form of fines, etc.

What is claimed is:

1. A two-stage process for the conversion of solid particulate biomass material, the process comprising:
   (i) a first stage comprising the step of subjecting the solid particulate biomass material to a pyrolysis reaction in a first zone of a reactor to produce primary reaction products;
   (ii) a second stage comprising the step of subjecting at least part of the primary reaction products to a catalytic conversion reaction in a second zone of the reactor, in the presence of a catalyst, to produce secondary reaction products, wherein the first and second zones of the reactor are in fluid communication and further wherein the second zone of the reactor is positioned above the first zone of the reactor; and (iii) wherein the first and second zones each have an internal diameter and wherein the internal diameter of the second zone is less than the internal diameter of the first zone.

2. The two-stage process according to claim 1 further comprising removing solid particles from the secondary reaction products, wherein the solid particles comprise deactivated catalyst particles.

3. The two-stage process according to claim 2 further comprising regenerating at least part of the deactivated catalyst particles, forming regenerated catalyst particles.

4. The two-stage process according to claim 3 further comprising stripping volatile materials from the deactivated catalyst particles prior to regenerating.

5. The two-stage process according to claim 1 further comprising recycling catalyst particles back to the first zone, or the second zone, or both the first and second zones of the reactor.

6. The two-stage process according to claim 3 further comprising recycling at least a portion of the regenerated catalyst particles back to the reactor.

7. The two-stage process according to claim 6 wherein at least a portion of the regenerated catalyst particles are recycled back to the second zone of the reactor.

8. The two-stage process according to claim 1 wherein the reactor temperature in the second zone is higher than the reactor temperature in the first zone.

9. The two-stage process according to claim 8 wherein the reactor temperature in the first zone is in the range of from about 350° C. to about 600° C.

10. The two-stage process according to claim 8 wherein the reactor temperature in the first zone is in the range of from 400° C. to 550° C.

11. A process for converting solid particulate biomass material in a single circulating fluidized reactor, the process comprising:
(i) pyrolyzing at least a portion of the solid particulate biomass material to form primary reaction products within a lower zone of the reactor, the lower zone having a frustrum geometry; and
(ii) catalytically converting at least a portion of the primary reaction products into secondary reaction products in the presence of a catalyst within an upper cylindrical zone of the reactor
wherein the lower zone of the reactor is in fluid communication with the upper zone of the reactor and further wherein each of the first zone and second zone have an internal diameter, the diameter of the lower zone being greater than the diameter of the upper zone.

12. The process according to claim 11 further comprising removing solid particles from the secondary reaction products, wherein the solid particles comprise deactivated catalyst particles.

13. The process according to claim 11 further comprising recycling catalyst particles back to the lower zone, or the upper zone, or both the lower and upper zones of the reactor.

14. The process according to claim 12 further comprising stripping volatile materials from the deactivated catalyst particles.

15. The process according to claim 14 further comprising regenerating at least part of the deactivated catalyst particles from the stripper, forming regenerated catalyst particles.

16. The process according to claim 15 further comprising recycling regenerated catalyst particles back to the reactor.

17. The process according to claim 16 wherein at least a portion of the regenerated catalyst particles are recycled back to the upper zone of the reactor.

18. The process according to claim 11 wherein the reactor temperature in the upper zone is higher than the reactor temperature in the lower zone.

19. A two-stage process for the conversion of solid particulate biomass material in a single reactor, the process comprising:
(i) introducing a lift gas into a first zone of the reactor and pyrolyzing the solid particulate biomass material in the first zone to produce primary reaction products;
(ii) conveying the primary reaction products within the lift gas to a second zone of the reactor and converting in the presence of a catalyst at least part of the primary reaction products to secondary reaction products wherein the velocity of the lift gas is accelerated upon entering the second zone of the reactor;
(iii) wherein the first and second zones of the reactor are in fluid communication and further wherein the second zone of the reactor is positioned above the first zone of the reactor; and wherein the first and second zones each have an internal diameter and wherein the internal diameter of the second zone is less than the internal diameter of the first zone.

20. The two-stage process of claim 19, wherein the biomass is pyrolyzed in the first zone in a bed ebulliated or fluidized with the lift gas.

21. The two-stage process of claim 19, wherein solid particulate biomass material is fluidized with the lift gas prior to pyrolysis.

22. The two-stage process of claim 19, wherein inert particulate material, deactivated particulate catalyst material or a combination thereof is in the first zone of the reactor and is conveyed to the second zone of the reactor in the lift gas.

23. The two-stage process of claim 19, wherein a fluidizable particulate solid heat carrier material comprising deactivated particulate catalyst is in the first zone of the reactor.

24. The two-stage process of claim 23, wherein the mean particle diameter of the fluidizable particulate solid heat carrier material is in the range of from about 50 μm to about 600 μm.

25. The two-stage process of claim 19, wherein a particulate solid heat material is in the first zone and further wherein the temperature in the first zone is maintained with the particulate solid heat material.

26. The two-stage process of claim 19, further comprising quenching the temperature in the second zone with a gas, solid particulate material or steam having temperature lower than the primary reaction products conveyed into the second zone.

* * * * *